United States Patent Office 2,718,205
Patented Sept. 20, 1955

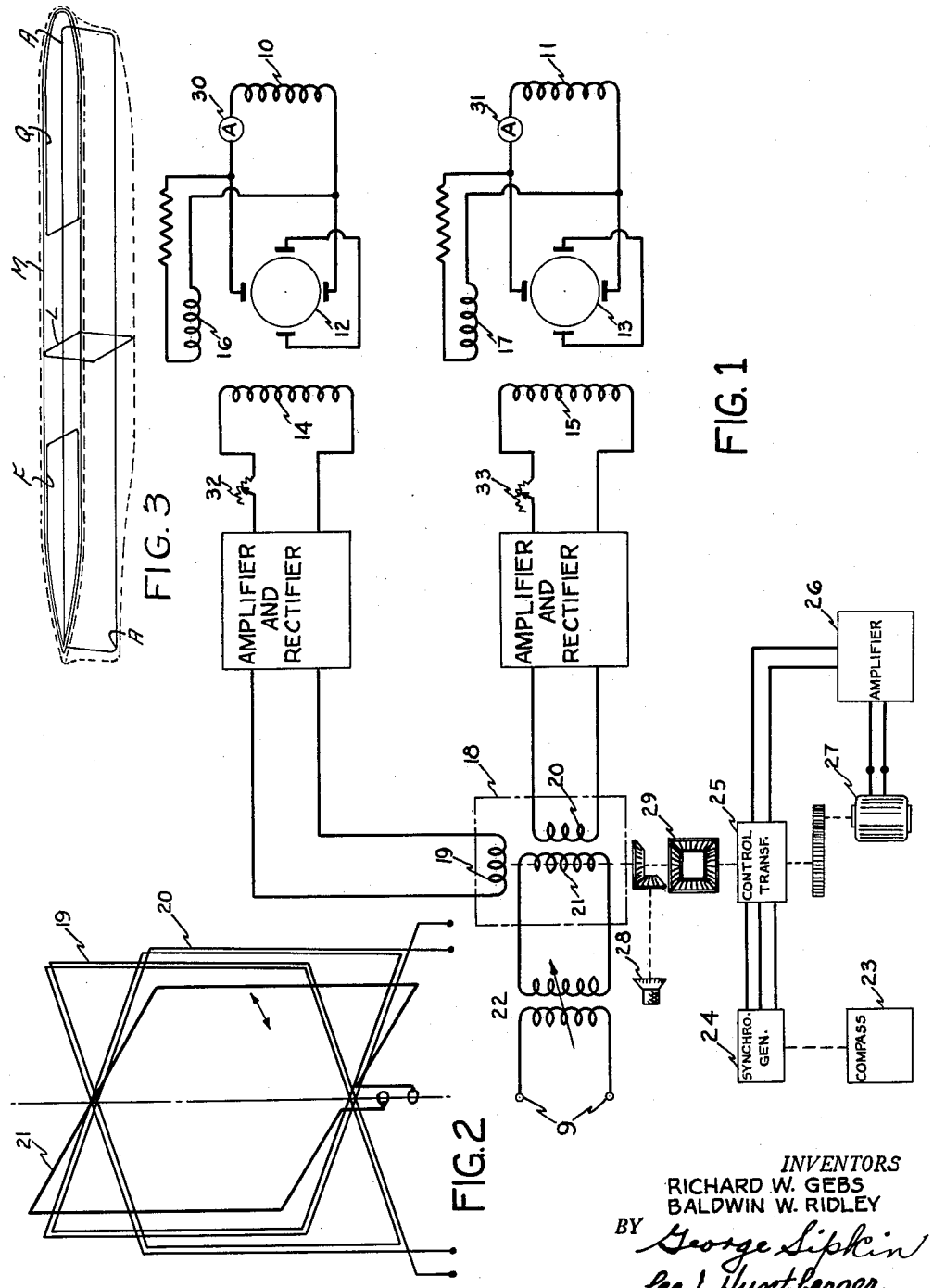

2,718,205

DEGAUSSING SYSTEM

Richard W. Gebs, New York, and Baldwin W. Ridley, Valley Stream, N. Y.

Application November 10, 1952, Serial No. 319,801

2 Claims. (Cl. 114—240)

(Granted under Title 35, U. S. Code (1952), sec. 266)

The invention described herein may be manufactured and used by or for the Government of the United States of America for governmental purposes without the payment of any royalties thereon or therefor.

The invention described herein is related to the invention described in the copending application of Richard W. Gebs and Baldwin W. Ridley, Serial Number 319,802, filed November 10, 1952, and entitled Degaussing System.

This invention relates to magnetic systems and more particularly to systems for producing magnetic fields of such magnitude and direction that they nullify particular existing magnetic fields.

Since the advent of magnetically operated explosives such as magnetic mines and magnetic torpedoes, considerable research has been directed toward the development of countermeasures for use against these weapons.

Magnetic mines and torpedoes are generally designed to detonate when the earth's magnetic field is locally disturbed or distorted due to the proximity of a vessel. The said field distortion is caused by the fact that the vessel has in it produced its own magnetic field and superimposes this field on the earth's field. The field of the vessel may have any angle with respect to the horizontal axis of the vessel and any magnitude but for convenience the field of the vessel may be divided into an induced magnetic component, and a permanent magnetic component. The vessel's induced magnetic component is caused by the vessel's becoming a magnet in the presence of the earth's field. The induced magnetization of the vessel occurs along the line of the earth's field. The vessel's permanent magnetic component is caused by the vessel's being magnetized at some previous time due to mechanical working of the steel in the earth's field or by electromagnetic agitation. The permanent magnetic component of the vessel remains substantially constant in magnitude and direction for short periods of time and is independent of immediate field conditions and heading, whereas the induced magnetic component varies as a function of the vessel's latitude and heading.

Since the purpose of degaussing is to minimize or nullify the disturbance or distortion of the earth's magnetic field, it is first necessary to determine the magnetic field of the vessel. This is accomplished by obtaining plots of the vessel's magnetism as the latter passes over a magnetic range. From these plots the degaussing needs of the vessel may be readily determined. To overcome the distortion of the earth's field caused by superimposing the components of the vessel's field thereon, coils of cable are wound about the vessel and are called degaussing coils or degaussing belts, the word coils being used in this description. The coils are energized from a D. C. source and produce magnetic field components equal and opposite to the components of the vessel's field. Each coil is composed of a main loop and may in addition have smaller loops in the area covered by the main loop and usually at the same level. These smaller loops oppose localized peaks that occur in the vessel's magnetic field within the area covered by the main loop.

The current flow through the coils for overcoming the permanent magnetic component is determined and then kept constant between magnetic checks of the vessel. Where the vessel is not outfitted with separate degaussing coils for the permanent and induced components respectively, the current through the coils is varied as a function of latitude and heading of the vessel, the total current being the resultant of the summation of the current necessary to neutralize the permanent magnetic component and the varying current necessary for neutralizing the induced magnetic component. The currents for neutralizing the permanent and induced magnetic components may be additive or subtractive depending upon field conditions.

The coils employed for degaussing are broadly classified as follows:

(1) An M or main coil which encircles the vessel in a horizontal plane usually at about the level of the water line and is designed to neutralize the vertical component of the combined permanent and induced magnetic components.

(2) An F or forecastle coil and a Q or quarterdeck coil, the former of which coils encircles approximately the forward one-third of the vessel and the latter of which coils encircles approximately the after one-third of the vessel; these coils usually are located beneath the upper decks of the forward and after parts of the vessel. The F and Q coils neutralize the effect of the longitudinal component of the vessel's magnetic field. The F and Q coils may be separate or they may be serially connected. In addition, they may be subdivided so that the individual portions thereof are designed to nullify separately the portions of the induced and permanent magnetic components longitudinal of the vessel.

(3) An L or longitudinal coil which runs with its loops in vertical planes, the axis of the coil being parallel to the longitudinal axis of the vessel for nullifying the portion of the field longitudinal of the vessel. Though the L coil can more accurately simulate the longitudinal portion of the field of the vessel, it is not used much due to installation difficulties. Instead, the F—Q coils are generally used.

(4) An A or athwartship coil which has its loops in vertical planes running longitudinally of the vessel for neutralizing the portion of the induced magnetic component transverse to the axis of the vessel in the horizontal plane. The permanent magnetic component is usually neglected in A coil current settings because the portion thereof directed athwartship is small.

An object of this invention is to provide a system for neutralizing a magnetic field.

A further object is to provide a plurality of degaussing coils for a vessel for neutralizing the vessel's field, the current flow through the degaussing coils varying as a function of the vessel's heading.

A further object is to provide means for varying the degaussing field strength of any body in proportion to the sine and cosine of the angle that the axis of the body makes with magnetic north.

A further object is to vary the current flow through the vessel's proper degaussing coils in proportion to the sine and cosine of the angle of deviation of the vessel's heading with respect to magnetic north.

A further object is to vary the current flow through the degaussing coils arranged for nullifying the vessel's magnetic component longitudinal thereof in proportion to the cosine of the angle between the vessel's heading and magnetic north.

A further object is to vary the current flow through the degaussing coils arranged for nullifying the magnetic component athwartship as a function of the sine of the angle between the vessel's heading and magnetic north.

Other objects and many of the attendant advantages of this invention will be readily appreciated as the same becomes better understood by reference to the following detailed description when considered in connection with the accompanying drawings wherein:

Fig. 1 is a schematic diagram showing the arrangement of components according to a preferred embodiment of this invention, and Fig. 2 is a diagrammatic showing of the components of the resolver used in the arrangement of Fig. 1.

Fig. 3 illustrates diagrammatically the orientation of degaussing coils M, F, Q, A and L on a vessel.

The disclosed embodiment of the invention includes means for continuously neutralizing a vessel's magnetic field as its heading changes. The variation of the vessel's magnetic field as its heading changes is limited to a variation in the horizontal component of the induced magnetization. More specifically, if the vessel is located at a fixed point in the earth's field and is then rotated about a vertical axis passing through the vessel, the permanent magnetism of the vessel would remain constant, the vertical component of the induced magnetism would remain constant, but the horizontal component of the induced magnetism would vary as a function of the angle between the heading of the vessel and magnetic north.

An A coil 10 is provided to nullify the induced horizontal magnetic component athwartship and an FI—QI coil 11, which comprises an F or forecastle coil and a Q or quarterdeck coil serially connected is provided to overcome the induced horizontal magnetic component longitudinal of the vessel. When the ship is positioned in a north-south direction, the horizontal component of the induced magnetism is longitudinal of the vessel. The FI—QI coil 11 has to produce maximum field strength to nullify this magnetic component whereas the A coil 10 produces no field since there is no induced magnetic horizontal component athwartship. The reverse is true when the vessel is positioned in an east-west direction. For any angular position of the vessel in between north-south and east-west, the field strength of FI—QI coil 11 should be varied in direct proportion to the cosine of the angle between magnetic north and the heading of the vessel and the field strength of the A coil 10 should be varied in direct proportion to the sine of the angle between magnetic north and the heading of the vessel. Current for coil 10 is supplied by an amplidyne 12 and current for coil 11 is supplied by an amplidyne 13. The amplidynes' outputs are varied by varying the energization of the respective reference fields 14 and 15. Both amplidynes 12 and 13 are adjusted to have a linear output by properly setting the voltage control field 16 of amplidyne 12 and voltage control field 17 of amplidyne 13. Rheostats 32 and 33 may be used to preset the maximum outputs of the amplidynes.

The energization of the respective reference fields 14 and 15 are controlled by a resolver 18. The resolver 18 transforms a uniform A. C. input voltage into voltage components that vary in proportion to the sine and cosine respectively, of an angular deviation. The resolver 18 has two stationary coils 19 and 20 mounted perpendicularly to one another about a single axis. The coil 21 is rotatably mounted about the axis of the stationary coils with the geometric center of all three coils being coincident. Rotor coil 21 functions as the primary of a transformer of which coils 19 and 20 are two separate secondaries. The A. C. input voltage is fed through a variable transformer 22 for energizing the rotor coil 21. The voltage induced in each of the secondaries 19 and 20 is proportional to the percentage of primary flux linking the respective secondaries. When the primary 21 is perpendicular to one of the secondaries no voltage is induced in that secondary and when the primary is parallel to said one secondary, maximum voltage is induced in that secondary. Therefore, if the angular position of rotor 21 is changed relative to the stator coils 19 and 20 so as to correspond with the heading of the vessel relative to the magnetic north, the degaussing coils 10 and 11 are energized as functions of the vessel's heading.

A follow-up system links the rotor coil 21 with the vessel's compass 23. This follow-up system comprises a synchro generator 24 whose rotor is linked to the vessel's compass and whose output is fed into a synchro control transformer 25. The output of the control transformer 25 is fed through a synchro amplifier for controlling a servomotor 27. The servomotor is geared to the shaft of the control transformer and rotor coil 21. When the relative positions of the vessel's compass 23 and rotor coil 21 change the follow-up system is unbalanced and begins to operate. When unbalance occurs servomotor 27 is energized to rotate in the proper direction till the system is again balanced which occurs when the position of rotor coil 21 corresponds to the position of the ship's compass 23. Manual means 28 suitably calibrated, in cooperation with differential gears 29 is provided to correct for deviations or misalignment.

Apparatus other than resolver 18 can be used in this invention. For example a pair of potentiometers calibrated in terms of sine and cosine, the rotors of which are linked, can be used without deviating from the spirit of this invention.

Likewise, the utility of this invention is not confined to vessels but may be extended to other types of bodies and may also be used for purposes other than degaussing.

In operation when a vessel equipped with the apparatus herein described leaves its berth to go out to sea, the degaussing system is checked to discover whether it is set properly. This is done by heading the vesesl in the direction of magnetic north and checking the ammeter 31 to see that the energization FI–QI coil 11 is maximum. Rheostat 33 may be used to vary that maximum. Dial 28 is used to correct for deviation, that is if output at 11 is not maximum for a heading of due north. Under these conditions, A coil 10 should be producing zero field. As the vessel's heading changes to a northwest direction, the ship's compass 23 rotates the shaft of the synchro generator 24 producing an unbalanced condition in the follow-up system.

The synchro control transformer 25 puts out a voltage to the synchro amplifier 26 corresponding to this unbalance. The amplifier 26 supplies power to the servomotor 27 so as to restore the balanced condition by rotating the control transformer shaft and the rotor coil 21 correspondingly. When balance is achieved FI–QI coil 11 is producing a lesser field, that is one proportional to the cosine of the angle between the ship's heading and magnetic north and the A coil 11 produces a field that is equal to the product of the maximum field it can produce multiplied by the sine of the said angle. The maximum field of the A coil is determined for nullifying the induced horizontal magnetic component when the vessel is in an east-west direction. Therefore as the heading of the vessel changes, the follow-up system between the compass and the resolver causes the resolver shaft to assume a corresponding position. The position of the resolver shaft controls the amount of field produced by the FI–QI coil and the A coil, respectively.

Obviously many modifications and variations of the present invention are possible in the light of the above teachings. It is therefore to be understood that within the scope of the appended claims the invention may be practiced otherwise than as specifically described.

We claim:

1. An apparatus for use in neutralizing a vessel's magnetism at all headings of the vessel by means of a pair of degaussing coils located about the vessel, the magnetic field producible by each being adapted to neutralize particular components of the vessel's magnetic field at all headings of the vessel, said apparatus comprising, a pair of amplidyne generators, each amplidyne generator being adapted to supply one of said degaussing coils, the output of said amplidyne generators being directly proportional one to the sine and the other to the cosine of the vessel's heading with respect to magnetic north, means for controlling the output of said amplidyne generators comprising a synchro transmitter operable by a ship's compass, a synchro control transformer electrically coupled to said transmitter, said synchro control transformer having a shaft, a synchro amplifier responsive to the unbalance between the transmitter and control transformer, a servomotor controlled by said synchro amplifier for driving the rotor of the control transformer, a resolver having a rotor coil coupled to the control transformer shaft, the resolver putting out a pair of distinct voltages, one voltage being proportional to the sine and the other voltage being proportional to the cosine respectively of the angle between the vessel's heading and magnetic north, a pair of units each comprising a combined amplifier and rectifier, each unit receiving one of said voltages for varying the reference field of each amplidyne whereby each of the degaussing coils is energized as a function of the vessel's heading.

2. An apparatus for use in neutralizing a vessel's magnetism at all headings of the vessel by means of a pair of degaussing coils located about the vessel, the magnetic field producible by each coil being adapted to neutralize particular components of the vessel's magnetic field at all headings of the vessel, said apparatus comprising; a pair of current generating means, each of said current generating means being adapted to supply one of said degaussing coils, the output currents of said pair of current generating means being directly proportional one to the sine and the other to the cosine of the vessel's heading with respect to magnetic north, means for controlling the outputs of said current generating means including a synchro transmitter operable by a compass, a synchro control transformer electrically coupled to said synchro transmitter, said synchro control transformer having a shaft, a synchro amplifier responsive to electrical unbalance between said transmitter and said control transformer, a servomotor connected to and controlled by said synchro amplifier for driving the rotor of said control transformer, a resolver coupled to said control transformer shaft, said resolver putting out a pair of distinct voltages, one voltage being variable in proportion to the sine and the other voltage being variable in proportion to the cosine, respectively, of the angle between the vessel's heading and magnetic north, for controlling the outputs of said pair of current generating means whereby each of the degaussing coils is adapted to be energized as a function of the vessel's heading.

References Cited in the file of this patent

UNITED STATES PATENTS

| | | |
|---|---|---|
| 2,412,617 | Jenkins | Dec. 17, 1946 |
| 2,421,583 | Stuart, Jr. | June 3, 1947 |
| 2,519,395 | Perlow et al. | Aug. 22, 1950 |
| 2,571,106 | Brannin | Oct. 16, 1951 |
| 2,614,776 | Rossire | Oct. 21, 1952 |